June 13, 1933.　　　　I. SAUERWALD　　　　1,914,298
TIRE CHAIN FASTENER
Filed Aug. 24, 1932
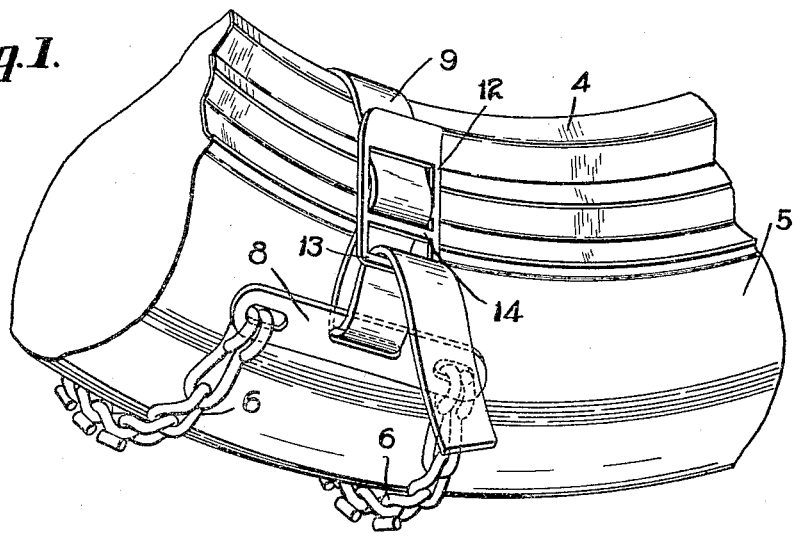
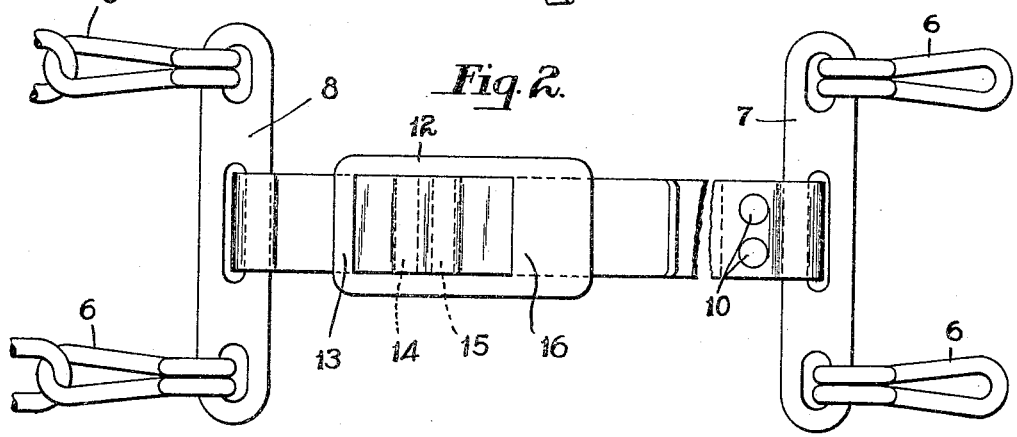
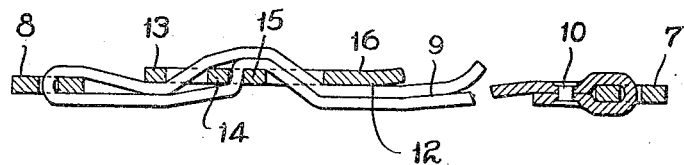
INVENTOR
Irwin Sauerwald
By Archworth Martin,
attorney.

Patented June 13, 1933

1,914,298

UNITED STATES PATENT OFFICE

IRVIN SAUERWALD, OF YORK, PENNSYLVANIA, ASSIGNOR TO THE McKAY COMPANY, OF PITTSBURGH, PENNSYLVANIA, A CORPORATION OF PENNSYLVANIA

TIRE CHAIN FASTENER

Application filed August 24, 1932. Serial No. 630,181.

My invention is herein described as employed more particularly in connection with its application to anti-skid chains for vehicle wheels, but it will be understood that various features of the invention are susceptible of use in various other ways.

One object of my invention is to provide a fastening device which includes a tie member or tension member of strap-like form that can be frictionally held under tension with minimum danger of slipping or loosening.

Another object of my invention is to provide an improved fastener of the buckle type which will hold a strap against slipping, without the necessity of weakening the strap by providing perforations in the strap or providing toothed members which bite into the strap.

Still another object of my invention is to provide a fastening device of such form that it may be conveniently employed to hold anti-skid chains on the treads of vehicle wheels at desired degrees of tension and with minimum danger of loosening.

A further object of my invention is to provide a buckle of simplified and improved form.

In the accompanying drawing, Figure 1 shows a portion of a vehicle wheel with my fastening device applied thereto; Fig. 2 is a plan view, on an enlarged scale, of a portion of the structure of Fig. 1; and Fig. 3 is a longitudinal sectional view through the structure of Fig. 2.

A portion of a wheel rim 4 is shown that carries a tire 5 in the usual manner. Anti-skid cross chains 6 are disposed across the tread of the tire and these chains may be of any suitable form. The chains are connected at their ends to plates or bars 7 and 8. It will be understood, of course, that the chains 6 need not be arranged in pairs, but that a single cross chain could be connected to bars corresponding to the bars 7 and 8, or that any number of cross chains could be so connected.

The chains are intended to function in the manner of any various known types of anti-skid chains, including those wherein a complete series of cross chains are connected at their ends to side chains that are disposed against the sides of the tire or the wheel rim.

The present invention is shown as employed in connection with what is sometimes termed unit chains that consist of one or more cross chains, each one or each group of which is individually secured to the vehicle wheel, independently of the others, by separate fastening means, instead of all of the cross chains being connected to the usual annular side chains.

A strap 9 is looped at one end through the bar 7 and has the looped end fastened by rivets 10, or other suitable fastening means. The other end of the strap is passed through the central slot in the bar 8 and the strap is folded back upon itself, as shown more clearly in Fig. 3. The strap is threaded through slot-like openings in a buckle plate 12 which has transversely-extending perforations that form cross bars 13, 14, 15 and 16. That portion of the strap 9 intermediate its ends, and which may be termed the body portion, is disposed beneath or behind the cross bar 16, extends over the cross bar 15 and beneath the cross bars 14 and 13.

The buckle plate is thereby normally held on the strap when the strap is not connected to the plate 8. The buckle plate may be slid to any desired position longitudinally of the strap 9.

In connecting the plates 7 and 8, the free end of the strap 9 is passed through the bar 8 and between the bars 13 and 14, as shown more clearly in Fig. 1. Said free end is then pulled, to place the cross chains 6 under the desired degree of tension. The free end of the strap is then passed over the bars 14 and 15 and beneath the bar 16, the buckle plate, of course, being tilted sufficiently to permit passing the strap beneath the bar 16. Upon release of the buckle plate and the strap, the parts will lie in the position shown in Fig. 3. In this position, any pull on the looped ends of the strap will, of course, tend to flatten the strap and cause it to snugly engage the corners of the bars 13, 14, 15 and 16, thus the inner portion of the strap will bind against the one inner corner of the bar 14 and against the outer corners of the bar 15, while the bars 13 and 16 will exert a binding action against the outer portion of the strap. Tension on these inner and outer layers or portions of the strap, will result in each strap layer forcing the other layer more firmly into engagement with its contacting cross bars, to thereby resist slipping of the strap. The provision of the two intermediate cross bars 14 and 15 instead of a single cross bar at that location constitutes an important feature of my invention, because a much better gripping engagement is thereby secured as between the strap and the buckle plate.

The strap is not likely to become actually loosened, even though there is some looseness of the chains through slight deflation of the tire or otherwise, because of the numerous lines of contact between the strap and the corners of the cross bars, as above-described. Furthermore, if the plate 8 were caused to move toward the buckle plate, it would tend to push the upper layer of the strap further beneath the cross bar 13, while if an endwise thrust was imparted by the plate 7 toward the buckle plate, the tendency would be to push the outer layer of the strap more firmly into engagement with the cross bar 16.

The buckle plate can be so positioned that its cross bar 13 will lie adjacent to, or partially over the inner edge of the plate 8, thereby exerting additional binding action on the outer layer of the strap at that point. In order to remove the fastening device, the end of the buckle plate at the bar 16 may be pulled outwardly slightly to release the free end of the strap, whereupon the strap may be withdrawn from beneath the bar 16 and thereafter withdrawn from beneath the bar 13.

The bar 16 is preferably made of considerable width to serve as a lever extension, whereby the buckle may be readily tilted upwardly to facilitate the insertion and removal of the end of the strap between the bar 16 and the lower body portion of the strap. When the bar 16 is pulled outwardly, the bar 13 clamps the inner strap layer against the outer strap layer to relieve the end of the strap of tension, which facilitates the manipulation of the end of the strap without slippage of the strap or without the need for pulling force to be exerted thereon simultaneously with such manipulation.

I claim as my invention:—

1. The combination with two members to be connected, of a strap having one of its ends secured to one of said members and having a portion looped through the other member and overlying the intermediate portion of the strap, and a buckle plate having a series of laterally-spaced cross bars, the said intermediate portion of the strap being disposed behind the endmost cross bars and extending across the outer side of an intermediate cross bar and behind another intermediate cross bar, and the said overlying strap portion being disposed between the inner surfaces of said end bars and said intermediate portion of the strap and at the outer sides of the said intermediate bars.

2. The combination with two members to be connected, of a strap having one of its ends secured to one of said members and having a portion looped through the other member and overlying the intermediate portion of the strap, and a buckle plate having a series of laterally-spaced cross bars, the said intermediate portion of the strap being disposed behind the endmost cross bars and extending across the outer side of an intermediate cross bar and behind another intermediate cross bar, and the said overlying strap portion being disposed between the inner surfaces of said end bars and said intermediate portion of the strap and at the outer sides of the said intermediate bars, the bars of said plate lying in approximately a common plane.

3. The combination with two members to be connected, of a strap having one of its ends secured to one of said members and having a portion looped through the other member and overlying the intermediate portion of the strap, and a buckle plate having a series of laterally-spaced cross bars, the said intermediate portion of the strap being disposed behind the endmost cross bars and extending across the outer side of an intermediate cross bar and behind another intermediate cross bar, and the said overlying strap portion being disposed between the inner surfaces of said end bars and said intermediate portion of the strap and at the outer sides of the said intermediate bars, the said intermediate bars being spaced apart a distance not materially greater than the thickness of the strap.

4. The combination with two members to be connected, of a strap having one of its ends secured to one of said members and having a portion looped through the other member and overlying the intermediate portion of the strap, and a buckle plate having a series of laterally-spaced cross bars, the said intermediate portion of the strap being disposed behind the endmost cross bars and extending across the outer side of an intermediate cross bar and behind another intermediate cross bar, and the said overlying strap portion being disposed between the inner surfaces of said end bars and said intermediate portion of the strap and at the outer sides of the said intermediate bars, that end bar which is adjacent to the free end of the strap being elongated in a direction longitudinally of the buckle.

In testimony whereof I, the said IRVIN SAUERWALD have hereunto set my hand.

IRVIN SAUERWALD.